US007143405B2

(12) United States Patent
Liu et al.

(10) Patent No.: US 7,143,405 B2
(45) Date of Patent: Nov. 28, 2006

(54) METHODS AND ARRANGEMENTS FOR MANAGING DEVICES

(75) Inventors: Jun Liu, Bellevue, WA (US); Sureshkumar Natarajan, Redmond, WA (US); Vladimir Rovinsky, Redmond, WA (US); John M. Parchem, Seattle, WA (US); Soemin Tjong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 09/755,874

(22) Filed: Jan. 5, 2001

(65) Prior Publication Data

US 2002/0092011 A1 Jul. 11, 2002

(51) Int. Cl.
*G06F 9/44* (2006.01)
*G06F 15/177* (2006.01)

(52) U.S. Cl. .................. 717/173; 717/169; 717/170; 717/171; 709/220; 709/221

(58) Field of Classification Search ........ 717/168–178; 709/220–221
See application file for complete search history.

(56) References Cited

U.S. PATENT DOCUMENTS

| | | | | |
|---|---|---|---|---|
| 5,519,869 | A * | 5/1996 | Payne et al. ................... 713/2 |
| 5,649,196 | A | 7/1997 | Woodhill et al. | |
| 5,752,042 | A * | 5/1998 | Cole et al. .................. 717/173 |
| 5,765,173 | A | 6/1998 | Cane et al. | |
| 5,848,064 | A | 12/1998 | Cowan | |
| 6,269,396 | B1 * | 7/2001 | Shah et al. ................. 709/223 |
| 6,314,565 | B1 | 11/2001 | Kenner et al. | |
| 6,438,606 | B1 * | 8/2002 | Ward ........................... 709/238 |
| 6,457,175 | B1 * | 9/2002 | Lerche ........................ 717/172 |

FOREIGN PATENT DOCUMENTS

EP 11 50 207 10/2001

OTHER PUBLICATIONS

Hollingsworth et al. "Using Content Derived Names for Configuration Management"; 1997; ACM; pp. 104-109.
Stuart, Linda; "NetWare Mobile Extends Network to off-line Users" Info Canada v21, Novell's Remote Access Software Product Announcement, Feb. 1996, p. 13.

(Continued)

*Primary Examiner*—Tuan Dam
*Assistant Examiner*—Chuck Kendall
(74) *Attorney, Agent, or Firm*—Lee & Hayes, PLLC

(57) ABSTRACT

Improved methods and arrangements are provided for updating software and other data in managed devices. The methods and arrangements provide for a failsafe upgrade to all of the code and any data in the managed device, including any code or data used to provide such upgrades. For example, a method for providing software to a device is provided that includes identifying essential software within the device; essential software including software necessary to operate the device and provide external communications. The method further includes identifying remaining portions of software within the device as non-essential software, and downloading new essential software from an external source to the device and storing the new essential software in memory by overwriting at least a portion of the non-essential software. After downloading the new essential software, the method further includes attempting to operate the device and provide external communications using the new essential software, and upon successfully operating the device and providing external communications, using the new essential software to selectively download new non-essential software and store the new non-essential software in memory by overwriting at least a portion of the old essential software.

27 Claims, 5 Drawing Sheets

OTHER PUBLICATIONS

Spanbauer, Scott; "Happy 2000 or 1900! Qwerty Versus Dvorak. Stop a Hard Disk from Churning" PC World vol. 14, No. 1, Nov. 1996, p. 286+.

Millar, E. L., Akala, K, Hollingsworth, J. K.; "Using Content-Derived Names for Package Management in Tci" USENIX Assoc. Berkeley, CA, Sep. 1998, pp. 171-179.

Kerstetter, J.; "netDeploy 3.0 Packs lots of ESD Power" PC Week, v14, n46, Nov. 1997, p. 33.

Hollingsworth et al.; "Binary Version Management for Computational Grids", 1999; Parallel Procesing Letters v9 n2 1999 p. 215-225; issn 0219-6264.

\* cited by examiner

METHODS AND ARRANGEMENTS FOR MANAGING DEVICES

RELATED APPLICATIONS

This patent application is related to co-pending U.S. patent application Ser. No. 09/756,052, filed Jan. 5, 2001, entitled "Methods and Arrangements for Providing Improved Software Version Control in Managed Devices."

TECHNICAL FIELD

This invention relates to managed devices, and more particularly to improved methods and arrangements for use in managing software on the devices.

BACKGROUND

Managed devices, such as computers, set-top boxes, entertainment centers, communication devices, and the like, often require periodic updates to their software suite. Such updates are typically carried out via another computer or device that is coupled to the managed device and arranged to download the updated software or other data to the managed device. For example, a server computer can be configured to provide downloadable updates to client devices over a communication link.

Conventional updating techniques tend to rely upon down loader code within the managed device to handle the upgrades and to prevent upgrade failures, which might otherwise render the managed device useless. As such, the down loader code, which can be significant in size, is usually permanently stored in the managed device. Consequently, the down loader code cannot usually be upgraded itself using conventional methods.

It would be beneficial to be able to upgrade the down loader code within a managed device. Hence, there is a need for improved methods and arrangements for updating the software in such managed devices. Preferably, the methods and arrangements will allow for a failsafe upgrade to all of the code in the managed device, including any code used to provide such upgrades.

SUMMARY

Improved methods and arrangements are provided for updating software and other data in managed devices. The methods and arrangements provide for a failsafe upgrade to all of the code and any data in the managed device, including any code or data used to provide such upgrades.

By way of example, in accordance with certain aspects of the present invention, a method for providing software to a device is claimed. Here, the method includes identifying essential software within the device, the essential software including software necessary to operate the device and provide external communications. The method further includes identifying remaining portions of software within the device as non-essential software, and downloading new essential software from an external source to the device and storing the new essential software in memory by overwriting at least a portion of the non-essential software. In certain implementations the method further includes after downloading the new essential software, attempting to operate the device and provide external communications using the new essential software and upon successfully operating the device and providing external communications using the new essential software, selectively downloading new non-essential software and storing the new non-essential software in persistent memory by overwriting at least a portion of the old essential software or old non-essential software.

The above stated needs and others are also met by a claimed apparatus that is operated using software and operatively configured to identify as essential software that software which is necessary to operate the apparatus and provide for external communications. The apparatus is further configured to identify remaining portions of software as being non-essential software, download new essential software from an external source, and store the new essential software in memory by overwriting at least a portion of the non-essential software.

In accordance with still further aspects of the present invention, a system is claimed as having a network, a server device and a client device. The server device and client devices are each operatively coupled to the network. The client device is configured to selectively download data from the server client via the network, and operate substantially as the apparatus described above.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
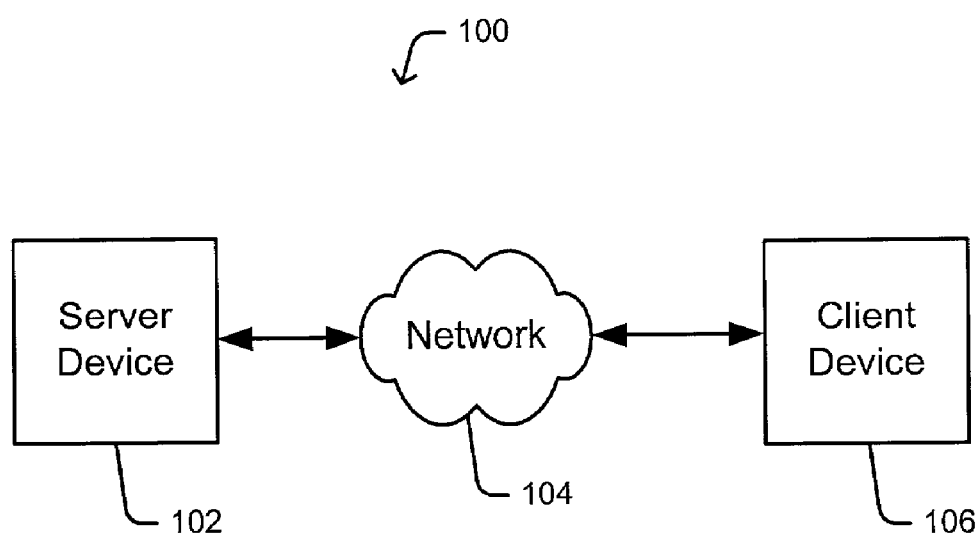
FIG. 1 is a block diagram depicting an exemplary arrangement having a server device and a (managed) client device.

An effective upgrade systems design should be fail proof, provide revision control and be sufficiently fast at downloading the updated code/data. The upgrade process for certain conventional appliances, such as, e.g., an MSN Companion device, needs to meet all three of these requirements to be effective, because such appliance class devices do not typically have the processing and/or data storage capabilities as do regular personal computers (PCs). Here, if an upgrade fails in the middle of the process, it could potentially render the device totally useless.

Therefore, the goal of an upgrade process design is to ensure that there is always a way to download new upgrades even if the last upgrade failed. The conventional approach to this problem is to reserve some of the data storage space, and place a permanent down loading software (hereinafter, referred to generally as a "down loader") in it. Here, the down loader is a separate piece of software that is not used during the normal operation of the managed device.

There are several drawbacks with this technique, however. First, the down loader code can be quite significant in size. In the MSN Companion, for example, the down loader includes basic kernel code, file system drivers, TCP/IP stack code, communication device drivers, WinINET code, security, and display drivers. Adding more storage to such devices can be prohibitively expensive, since it would likely require additional persistent memory (e.g., FLASH memory). Secondly, the down loader itself in such a configuration cannot be upgraded. This could present a problem in the long run since, for example, the communication protocols, which the down loader uses, may need to change over time to keep up with the evolving communications technology and/or infrastructure. Thus, keeping the down loader fixed forever would be troublesome. For managed devices connected to the Internet, it may also be desirable to change Internet service providers (ISPs) from time to time. A fixed down loader, however, could make changing ISPs difficult, if not impossible. Thirdly, a fixed down loader simply cannot provide newer and potentially richer user interactivity features that enhance the upgrade process. To keep the down loader's size to a minimum, designers usually have to reduce the number and variety of such user features. For example, for certain managed devices it would be nice to show the user information about any new enhancements during the often long upgrade download. The code required to provide this and other capabilities tends to be too large in size to provide in a typical fixed down loader.

The following detailed description presents exemplary improved methods and arrangements that overcome the above-mentioned and other drawbacks associated with conventional down loaders. Before describing the methods and arrangements in greater detail, exemplary block diagrams are presented as depicting an exemplary client-server managed device arrangement (FIG. 1) and an exemplary client and/or server device (FIG. 2).

With reference to FIG. 1, an arrangement 100 is depicted as having a server device 102, a network 104 and a (managed) client device 106. Server device 102 and client device 106 are each configured to communicate with one another, via network 104. Thus, for example, client device 106 may from time-to-time check with server device 102 to determine if any updates to the code/data stored within client device 106 exist and are available from server device 102. If so, then client device 106 and server device 102 may immediately begin an updating process, or otherwise selectively establish a time in the future to begin such an updating process.

As depicted herein, server device 102 can be any type of computer or like machine that is capable of communicating updated code and/or data to client device 106. Likewise, client device 106 can be any type of computer or like machine capable of receiving the updated code and/or data from server device 102. By way of example, client device 106 may be a computer, an appliance, a mobile communication device, etc. Server device 102 may, for example, include a general-purpose or special-purpose computer, or like device.

Figure 2:
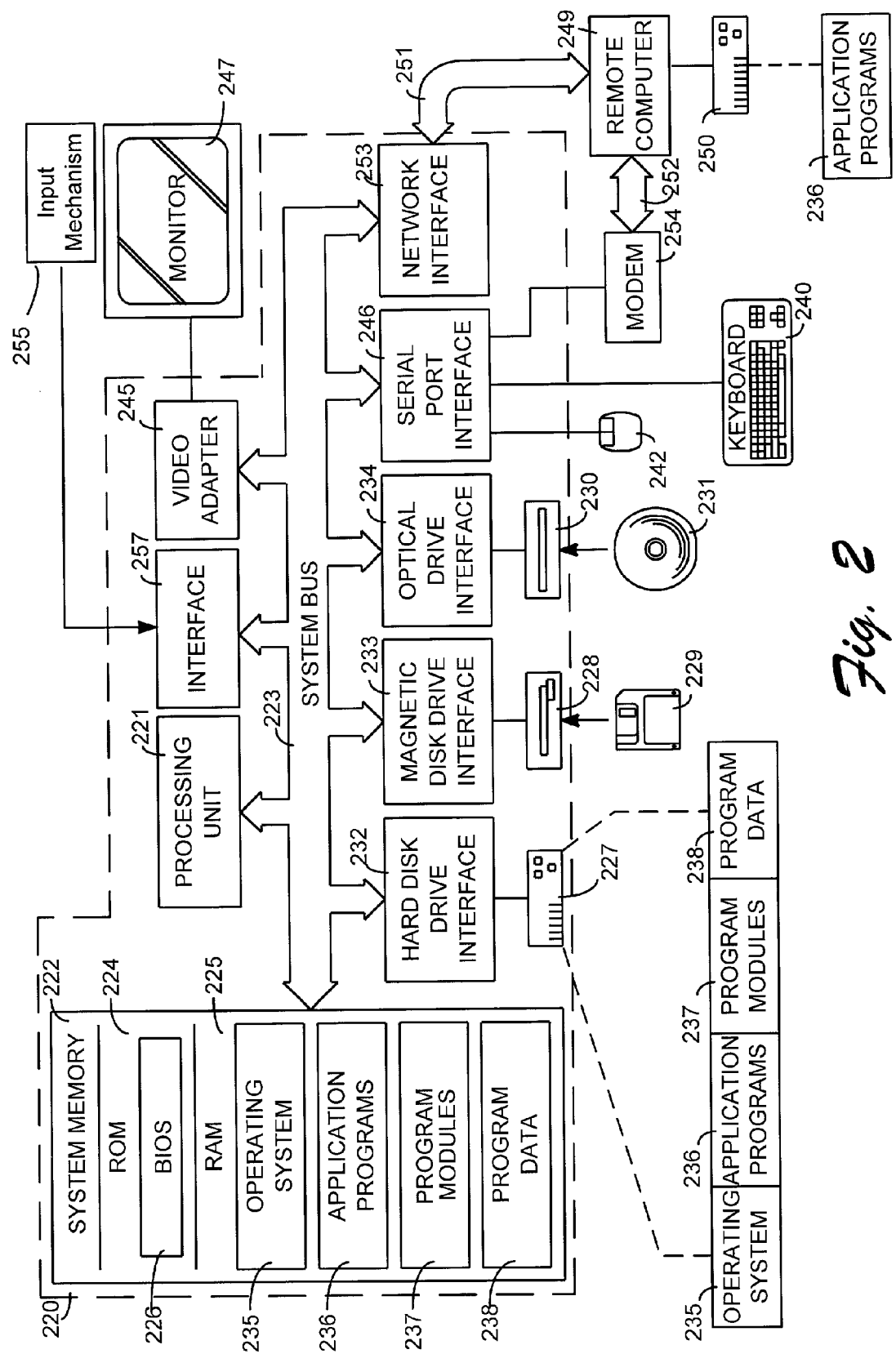
FIG. 2 is a block diagram of a computer environment having certain elements that are suitable for use in a server device and/or in a (managed) client device, e.g., as in FIG. 1.

With these alternatives in mind, attention is now drawn to FIG. 2, which is a block diagram depicting an exemplary computing system 200 having all or portions thereof suitable for use in either a server device 102 and/or client device 106.

Computing system 200 is, in this example, in the form of a PC, however, in other examples computing system may take the form of a dedicated server(s), a special-purpose device, an appliance, a handheld computing device, a mobile telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). A camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

With this introduction into certain exemplary arrangements being completed, the remaining detailed description will focus on exemplary improved methods for updating code/data therein.

As will be seen, with the improved methods and arrangements the operating system of client device 106 is further configured to determine which existing code/data is essential to the device's operation during upgrade and which code/data is not essential to the device's operation during upgrade. For example, the TCP/IP code would be designated by the operating system as being essential code, while a word processor (user) application would be designated as being non-essential code. During an upgrade to the operating system (which in this example includes only essential code/data), the newly downloaded essential code/data will be written into memory. If there is not enough free memory in the data storage space, then the newly downloaded essential code/data will overwrite non-essential code/data in the memory, as required. Following the download, client device 106 will attempt to reboot and reconnect to server device 102 using the newly downloaded code/data, i.e., the upgraded operating system. If the reboot and reconnection work correctly, then any non-essential code/data that was overwritten, is downloaded from server 102 and written to free memory including that previously used by the old version of the operating system.

Should the reboot or reconnection fail, then client device 106, will revert back to the previously used operating system during a subsequent reboot and reconnect.

As such, there is no need for a separate, permanent down loader. Furthermore, provided that each downloaded operating system is no larger than half the data storage capability, there is no need to expand the size of the data storage within client device 106.

In a more specific MSN Companion design example, the operation software was configured to handle the upgrade in this manner, without compromising safety and requiring additional temporary storage space. Here, the operation software was divided into two groups. The first group consisted of all the software necessary to do an upgrade, i.e., essential software. This essential software included the full operating system, file system, drivers, full Internet Explorer (IE) browser, graphics and upgrade application. The second group contained code/data that is not required during the upgrade process, i.e., the non-essential software. The samples of these files are: Java VM, an email program, and a word processor. As noted, the essential software must occupy less than half of the total data storage space. This is usually true, since user applications are typically larger in size than the OS. During a full upgrade, client device 106 first downloads all the essential files and saves them. If there is no space left for storing the essential files, then old non-essential files can be deleted to make room for the new download. After the download, the system will reboot to use the new essential software. Although it has only downloaded essential parts of the new software, client device 106, in this example, has enough code/data to connect to server 102 again and continue to transfer any non-essential files.

Therefore, if the transferring of the non-essential files is successful, one can safely delete the old the essential files. If the new software failed to do the downloading, then one can revert back to the old essential code. Either way, client device 106 will never lose the capability to provide for further downloading of code/data, both essential and non-essential.

Figure 3:
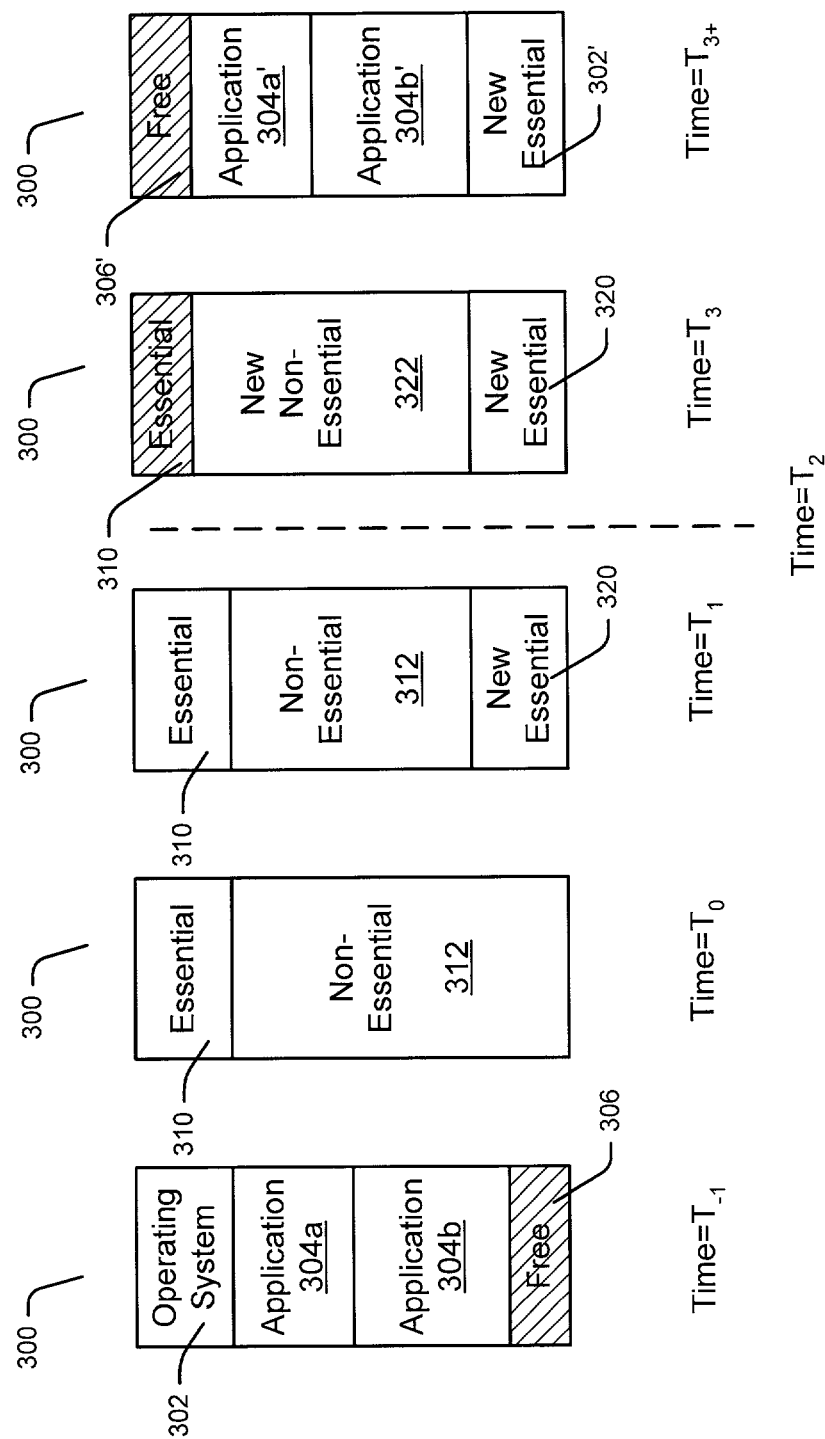
FIG. 3 is an illustrative diagram depicting a data storage element within a (managed) client device, e.g., as in FIG. 1, having certain types of software (code/data) therein.

Reference is now made to FIG. 3, which illustratively depicts an exemplary data storage space 300 within a (managed) client device 106, at various times during an upgrade. As illustrated, at time equals $t_{-1}$ (immediately prior to beginning the upgrade process), data storage space 300 includes an operating system 302, user applications 304a–b, and free space 306. Next, at the beginning of the upgrade process, i.e., at time $t_0$, a determination is made as to what code/data is essential software 310 and what is non-essential software 312. Here, in this illustrative example, operating system 302 has been included in essential software 310, while user applications 304a–b have been included along with free space 306 in non-essential software 312. During the upgrade process, essential software 310 remains intact, while all or part of non-essential software 312 is overwritten by new essential software 320, as depicted at time $t_1$. At time $t_2$, new essential software 320 is used to reboot client device 106 and if successful to then reconnect client device 106 to server device 102. Assuming that the reboot and reconnect are successful, then any new non-essential software 322 is downloaded, as needed, to replace overwritten portions of non-essential software 312 and/or provide upgrades to non-essential software 312. The upgrade process ends at time $t_3$, wherein new non-essential software 322 has overwritten a portion of the old essential software 310. The subsequent illustration, at time $t_{3+}$, shows the resulting new operating system 302', user applications 304a'–b', and new free space 306'.

Figure 4:
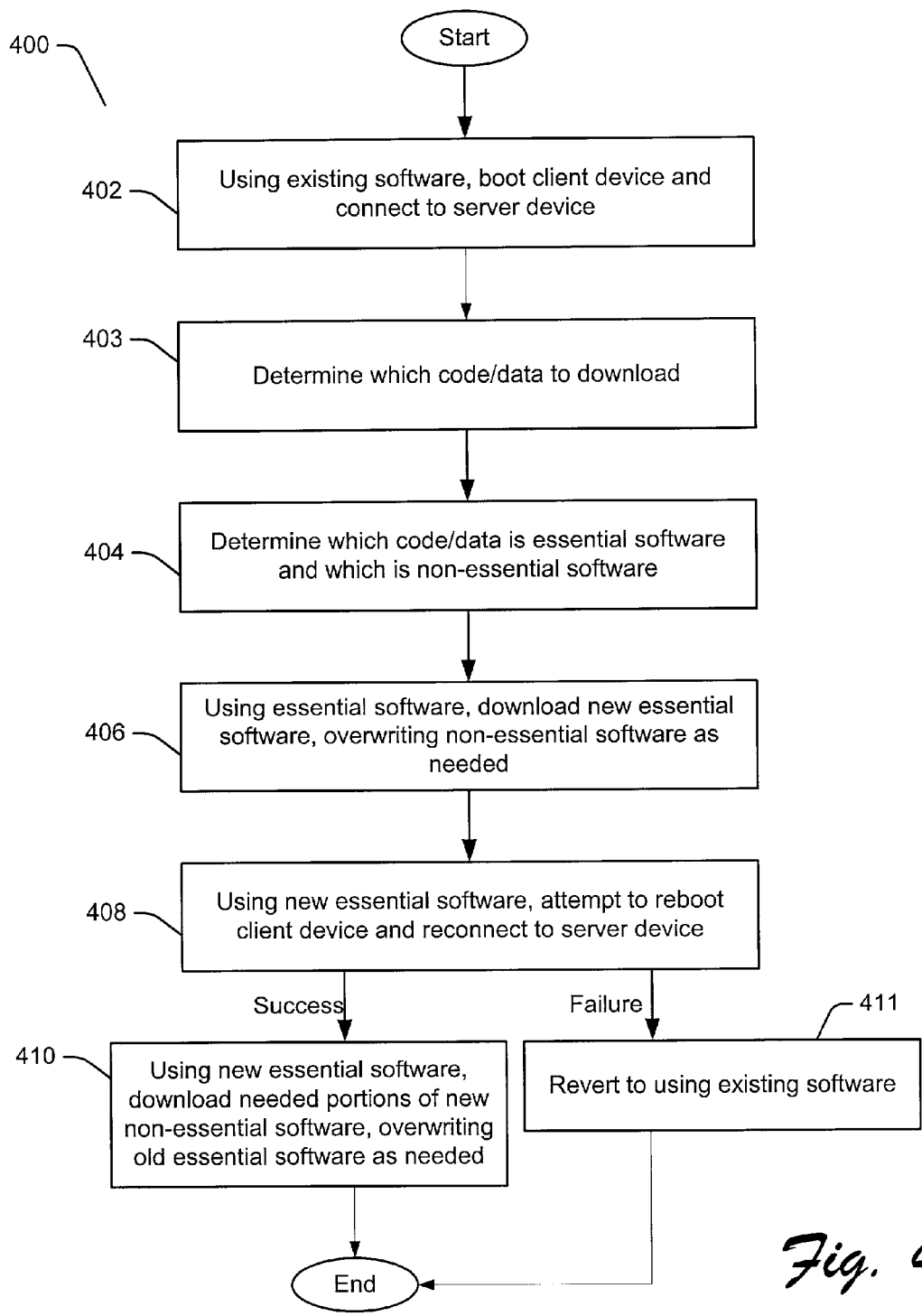
FIG. 4 is a flow diagram depicting a method for upgrading software within a (managed) client device, e.g., as in FIG. 1.

FIG. 4 is a flow diagram depicting a method 400 for updating client device 106. In step 402, the client device is made to operate using existing code/data. In step 403, a determination is made as to what code/data is to be downloaded form the server device. Next, in step 404, all portions of the existing code/data, along with new code/data at the server device, are determined to be either essential software or non-essential software. In step 406, the essential software is used to connect to server device 106 and download new essential software, overwriting all or part of non-essential software, as needed. Then, in step 408, client device 106 attempts to reboot and reconnect to server device 102, using the new essential software. If the attempts in step 408 are successful, then method 400 continues to step 410, wherein new non-essential software is downloaded, as needed and overwriting any old software too. If the attempts in step 408 fail, then method 400 proceeds to step 411, wherein client device 102 is booted and subsequently connected to server device 106 using the old essential software.

To manage different revisions of software is always a difficult task, especially when there is a partial upgrade of the software. An effective software version control system should exhibit the following three characteristics. First, the version control system needs to be able to tell whether two software images have the same version. Secondly, the version control system needs to be able to support incremental upgrades. Thirdly, the version control system needs to be able to provide an upgrade path from multiple older versions.

In accordance with certain aspects of the present invention, an improved software version control technique has been developed.

To better understand how the revision control technique works, however, there is a need understand how a compressed file system may be implemented within client device 106. To demonstrate this, an exemplary client device 106 in the form of an MSN Web Companion will be described. Here, the file system is essentially a compressed file system running on top a regular file system, such as FAT. Multiple uncompressed files are packed into a compressed image file, which carries the arbitrary extension *.cim. The *.cim files are then stored on the FAT file system directly.

Each image preferably contains files that are functionally related. For example, all IE browser files, such as mshtml.dll, shdocvw.dll and WinINET.dll are preferably compressed into one image whose name maybe "a6945jtv451ktc909btes61mv2.cim".

A search of the regular FAT file system only reveals many *.cim files. Unfortunately, this search result is of little use to regular applications, which do not understand the interworkings of the compressed *.cim files.

To solve this problem, a new file system mounting port has been developed. When an application accesses the files through the new path, the compressed file system driver is invoked and used to open the *.cim on the FAT drive and read out the file. Since the driver understands the compression scheme used in the *.cim, it will be able the feed the correct data to the application.

With the help of a compressed file system, client device 106 uses a system of unique files to ease the control of software revisions. Here, the client software consists of multiple compressed files and a list file that contains the list of all the names of the compressed files (*.cim). Every time the software is built, the compressed image file name is changed, and the resulting names are always globally unique. Therefore, if two compressed images share the same name, every file inside each of these is identical. In other words, they have the same revision. If the names are different, then the versions are not the same.

This feature makes version comparison and incremental upgrading extremely easy. To decide which files need to be upgraded, client device 106 only needs to check with server device 102 and compare the server's most up-to-date list with its own list of file names. If a file name from the server's list does not show up on the local driver, client device 106 needs to download that particular file. Since the files are preferably grouped by functionality when being compressed into *.cim files, usually only a small portion of *.cim files needs to be download and updated.

Figure 5:
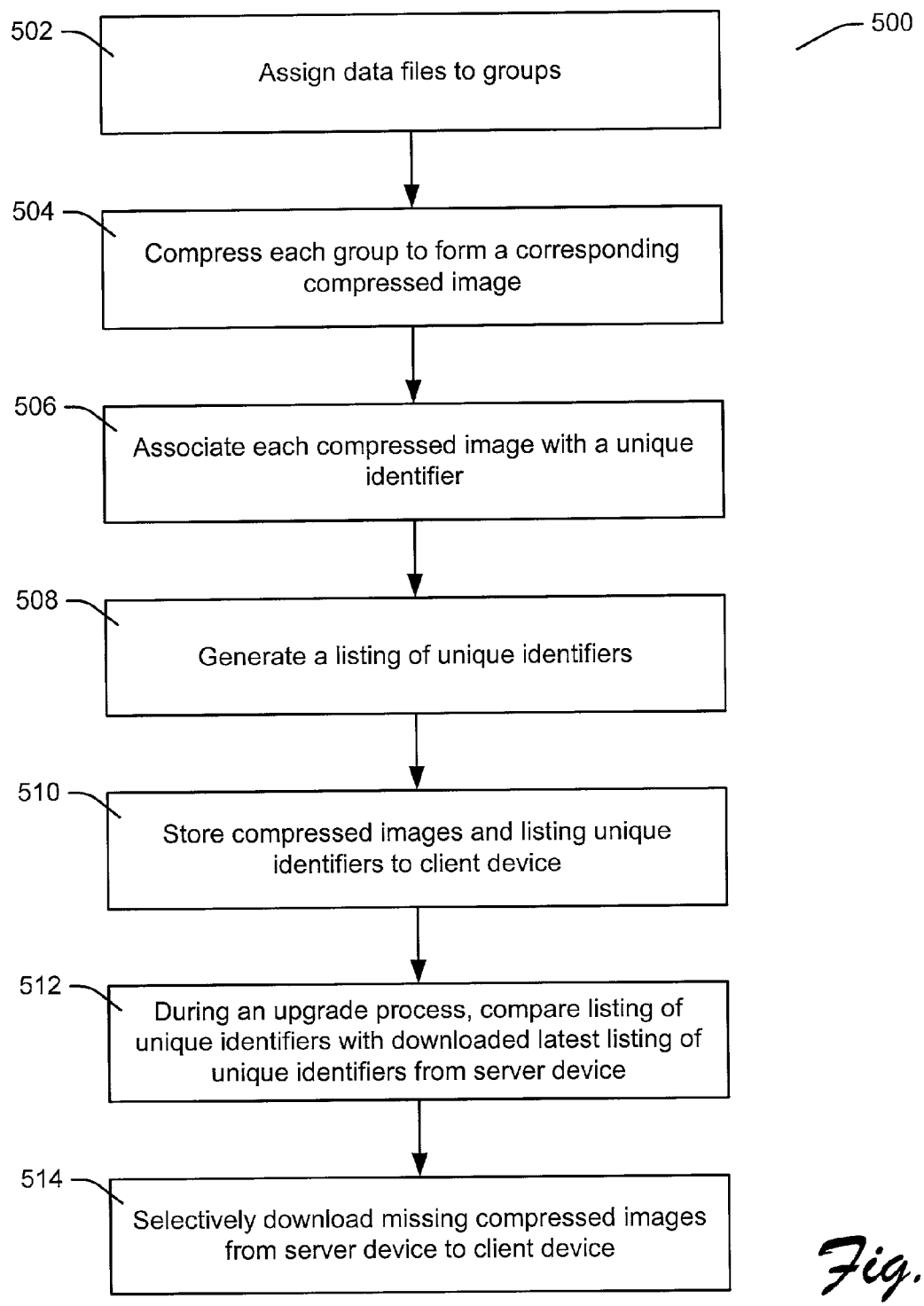
FIG. 5 is a flow diagram depicting a method for controlling versions of software within a (managed) client device, e.g., as in FIG. 1.

FIG. 5 is a flow diagram depicting a method 500 for providing software version control in a client device 106. In step 502, one or more files are determined to make up a group, wherein the software is divided as such into a plurality of groups. In step 504, each of the groups of files is compressed to form corresponding compressed images. Next in step 506, each compressed image is associated with a unique identifier. The unique identifier can be derived from a portion of the compressed image, for example. Then, in step 508, a listing of unique identifiers is generated. In step 510, each of the compressed images is stored with the memory of client device 106. Next, in step 512, during an upgrade process, the listing of unique identifiers within client device 106 is compared with the latest listing of unique identifiers as provided by server device 102. The compressed images that are missing from the client's listing of unique identifiers as determined from the comparison in step 512 are then selectively downloaded in step 514 from server device 102 to client device 106.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A computer-implemented method for providing software to a device, the method comprising:
   identifying essential software within a device, the essential software including software necessary to operate the device and provide external communications;
   identifying remaining portions of software within the device as non-essential software;
   downloading new essential software from an external source to the device and storing the new essential software in memory by overwriting at least a portion of the non-essential software; and
   upon successfully operating the device and providing external communications using the new essential software, selectively downloading new non-essential software and storing the new non-essential software in memory by overwriting at least a portion of either the essential software or the non-essential software.

2. The method as recited in claim 1, further comprising:
   after downloading the new essential software, attempting to operate the device and provide external communications using the new essential software.

3. The method as recited in claim 2, further comprising:
   upon unsuccessfully operating the device or unsuccessfully providing external communications, reverting back to the essential software.

4. The method as recited in claim 1, wherein the device is a managed device.

5. The method as recited in claim 1, wherein the external source includes a server device.

6. The method as recited in claim 1, wherein the external source includes a network.

7. The method as recited in claim 6, wherein the network includes the Internet.

8. The method as recited in claim 1, wherein the essential software includes software selected from a group comprising an operating system, a file system, at least one driver, a communication program, an Internet browser, and an upgrade application.

9. A computer-readable medium having computer-executable instructions for performing steps comprising:
   identifying essential software within a device, the essential software including software necessary to operate the device and provide external communications;
   identifying remaining portions of software within the device as non-essential software;
   downloading new essential software from an external source to the device and storing the new essential software in memory by overwriting at least a portion of the non-essential software; and
   upon successfully operating the device and providing external communications using the new essential software, selectively downloading new non-essential software and storing the new non-essential software in memory by overwriting at least a portion of either the essential software or the non-essential software.

10. The computer-readable medium as recited in claim 9, having further computer-executable instructions for:
    after downloading the new essential software, attempting to operate the device and provide external communications using the new essential software.

11. The computer-readable medium as recited in claim 10, having further computer-executable instructions for:

upon unsuccessfully operating the device or unsuccessfully providing external communications, reverting back to the essential software.

12. The computer-readable medium as recited in claim 9, wherein the device is a managed device.

13. The computer-readable medium as recited in claim 9, wherein the external source includes a server device.

14. The computer-readable medium as recited in claim 9, wherein the external source includes a network.

15. The computer-readable medium as recited in claim 14, wherein the network includes the Internet.

16. The computer-readable medium as recited in claim 9, wherein the essential software includes software selected from a group comprising an operating system, a file system, at least one driver, a communication program, an Internet browser, and an upgrade application.

17. An apparatus that is operated using software and operatively configured to identify as essential software that software which is necessary to operate the apparatus and provide for external communications, identify remaining portions of software as being non-essential software, download new essential software from an external source and store the new essential software in memory by overwriting at least a portion of the non-essential software; and upon successfully operating and providing external communications using the new essential software, selectively download new non-essential software and store the new non-essential software in the memory by overwriting at least a portion of either the essential software or the non-essential software.

18. The apparatus as recited in claim 17, wherein the apparatus is further configured to, after downloading the new essential software, attempt to operate and provide external communications using the new essential software.

19. The apparatus as recited in claim 18, wherein the apparatus is further configured to, upon unsuccessfully operating the apparatus or unsuccessfully providing external communications, reverting back to the essential software.

20. The apparatus as recited in claim 17, wherein the apparatus is a managed device.

21. The apparatus as recited in claim 17, wherein the essential software includes software selected from a group comprising an operating system, a file system, at least one driver, a communication program, an Internet browser, and an upgrade application.

22. A system comprising:

a network;

a server device operatively coupled to the network; and a client device operatively coupled to the network and configured to selectively download data from the server client via the network, and wherein the client device includes memory and is further operatively configured to identify as essential software that software which is necessary to operate the client device and provide for external communications via the network, identify remaining portions of software as being non-essential software, download new essential software from the server device over the network and store the new essential software in the memory by overwriting at least a portion of the non-essential software, and upon successfully operating and providing external communications using the new essential software, is further configured to selectively download new non-essential software and store the new non-essential software in the memory by overwriting at least a portion of either the essential software or the non-essential software.

23. The system as recited in claim 22, wherein the client device, after downloading the new essential software, is further configured to attempt to operate and provide external communications using the new essential software.

24. The system as recited in claim 23, wherein the client device is further configured to, upon unsuccessfully operating the client device or unsuccessfully providing external communications, reverting back to the essential software.

25. The system as recited in claim 22, wherein the client device is a managed device.

26. The system as recited in claim 22, wherein the network includes the Internet.

27. The system as recited in claim 22, wherein the essential software includes software selected from a group comprising an operating system, a file system, at least one driver, a communication program, an Internet browser, and an upgrade application.

* * * * *